US006829702B1

United States Patent
Jeremiah et al.

(10) Patent No.: US 6,829,702 B1
(45) Date of Patent: Dec. 7, 2004

(54) BRANCH TARGET CACHE AND METHOD FOR EFFICIENTLY OBTAINING TARGET PATH INSTRUCTIONS FOR TIGHT PROGRAM LOOPS

(75) Inventors: Thomas Leo Jeremiah, Hillsborough, NC (US); Charles Robert Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/626,247

(22) Filed: Jul. 26, 2000

(51) Int. Cl.[7] .............................................. G06F 9/32
(52) U.S. Cl. ...................... 712/241; 712/237; 712/239
(58) Field of Search ................................ 712/233, 237, 712/239, 241, 235, 207, 209

(56) References Cited

U.S. PATENT DOCUMENTS

| | | | | |
|---|---|---|---|---|
| 5,265,253 A | * | 11/1993 | Yamada ....................... | 717/160 |
| 5,951,679 A | * | 9/1999 | Anderson et al. ........... | 712/241 |
| 6,175,897 B1 | * | 1/2001 | Ryan et al. .................. | 711/119 |
| 6,560,693 B1 | * | 5/2003 | Puzak et al. ................. | 712/207 |
| 2001/0037444 A1 | * | 11/2001 | Munson et al. ............. | 712/207 |
| 2003/0041230 A1 | * | 2/2003 | Rappoport et al. ......... | 712/238 |

OTHER PUBLICATIONS

Structured Computer Organization, A. Tanenbaum, 1984.*

* cited by examiner

Primary Examiner—Eddie Chan
Assistant Examiner—Barry O'Brien
(74) Attorney, Agent, or Firm—Volel Emile; Dillon & Yudell LLP

(57) ABSTRACT

A processor that efficiently obtains target path instructions in the presence of tight program loops includes at least one execution unit for executing instructions and instruction sequencing logic that supplies instructions to the at least one execution unit for execution. The instruction sequencing logic includes an instruction fetch buffer and a branch prediction unit including a branch target cache. In response to prediction of a branch instruction as taken, the branch target cache causes multiple copies of a target instruction group to be loaded into the instruction fetch buffer under the assumption that the branch instruction is a member of the target instruction group. Thereafter, the branch target cache causes all but one of the multiple copies to be canceled from the instruction fetch buffer prior to dispatch if the branch instruction does not belong to the target instruction group. Thus, the branch target cache can meet the instruction fetch cycle time of the processor even for the worst case condition in which the branch instruction is within the target instruction group.

18 Claims, 3 Drawing Sheets

BRANCH TARGET CACHE AND METHOD FOR EFFICIENTLY OBTAINING TARGET PATH INSTRUCTIONS FOR TIGHT PROGRAM LOOPS

BACKGROUND OF THE INVENTION

1. Technical Field:

The present invention relates in general to data processing and, in particular, to processing branch instructions in a processor.

2. Description of the Related Art:

A superscalar processor for a computer system can comprise, for example, an instruction cache for storing instructions, one or more execution units for executing sequential instructions, a branch execution unit for executing branch instructions, instruction sequencing logic for fetching instructions from the instruction cache and routing fetched instructions to the various execution units for execution, and register files for storing operands and result data.

Branch instructions are utilized in a program to control the flow of instruction execution. Depending upon the type of a branch instruction and conditions present in the processor when the branch instruction is executed, branch execution may redirect execution from a sequential execution path (i.e., execution of instructions according to address order) to a non-sequential branch target path.

Branch instructions can generally be classified as either conditional or unconditional. Unconditional branch instructions change the flow of instruction execution from a sequential execution path to a specified branch target path and do not depend upon any condition. Thus, the branch in program flow specified by an unconditional branch instruction is always taken. In contrast, a conditional branch instruction indicates a branch in program flow that may or may not be taken depending upon a condition within the processor, for example, the state of a specified condition register bit or the value of a counter.

Conditional branch instructions can be further classified as either resolved or unresolved, based upon whether or not the condition upon which the branch depends is available when the conditional branch instruction is evaluated by the branch execution unit. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors predict whether or not the branch specified by a conditional branch instruction will be taken. Utilizing the result of the prediction, the instruction sequencing logic is then able to speculatively fetch instructions within the branch target path prior to the resolution of the branch, thereby avoiding a stall in sequential execution units in cases in which the branch is subsequently resolved as correctly predicted. Conventionally, prediction of unresolved conditional branch instructions has been accomplished utilizing static branch prediction, which predicts resolutions of branch instructions based upon criteria determined by a compiler prior to program execution, or dynamic branch prediction, which predicts resolutions of branch instructions by reference to branch history accumulated on a per-address basis within a branch history table. More recently, even more elaborate two-level branch prediction methodologies have been proposed that utilize a first level of branch history that specifies the resolutions of the last K branch instructions to index into a second level of branch prediction storage that associates a resolution prediction with each (or selected ones) of the $2^{K-1}$ possible branch history patterns.

In order to further accelerate instruction fetching, some processors predict the branch target path address as well as the branch direction. The address of the branch target path can be predicted with a branch target address cache (BTAC), which temporarily stores, in association with each of a plurality of branch instructions, the branch target address to which control was transferred when each branch was last taken. In lieu of a BTAC, some processors alternatively employ a branch target instruction cache (BTIC), which caches a few instructions in the predicted branch target path so the instruction pipeline can be primed without accessing the instruction cache.

The present invention recognizes that although the use of conventional branch prediction and path prediction circuitry (e.g., a BHT and BTAC) in a processor generally improves processor performance given typical branch prediction accuracies of over 95%, conventional path prediction circuitry has difficulty in processing tight instruction loops. In particular, in aggressive processor architectures, a traditional BTAC cannot meet the processor's instruction fetch cycle time if the branch target address falls within the same cache line as the associated branch instruction.

SUMMARY OF THE INVENTION

In view of the foregoing, the present invention provides a processor that efficiently obtains target path instructions even in the presence of tight program loops. The processor includes at least one execution unit for executing instructions and instruction sequencing logic that supplies instructions to the at least one execution unit for execution. The instruction sequencing logic includes an instruction fetch buffer and a branch prediction unit including a branch target cache.

When a conditional branch instruction is detected, the branch instruction is predicted as taken or not taken. In response to the prediction of the branch instruction as taken, the branch target cache causes multiple copies of a target instruction group to be loaded into the instruction fetch buffer under the assumption that the branch instruction is a member of the target instruction group. Thereafter, the branch target cache causes all but one of the multiple copies to be canceled from the instruction fetch buffer prior to dispatch if the branch instruction does not belong to the target instruction group. Thus, the branch target cache can meet the instruction fetch cycle time of the processor even for the worst case condition in which the branch instruction is within the target instruction group.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
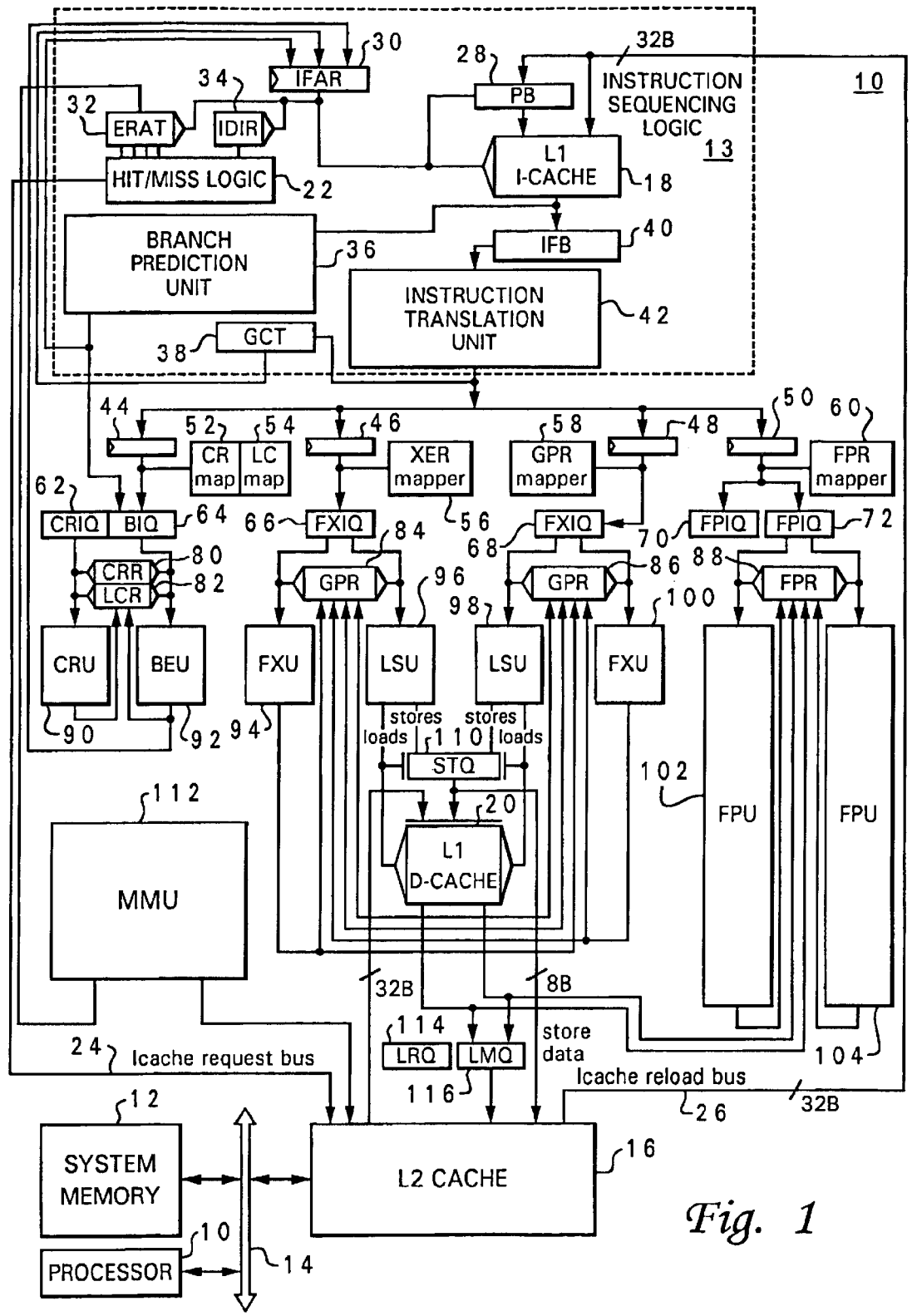
FIG. 1 depicts an illustrative embodiment of a data processing system with which the method and system of the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 includes an improved branch target cache that speculatively provides the processor's instruction fetch buffer with multiple copies of a target instruction group identified by a predicted branch target address. Multiple copies of the target instruction group are provided assuming a worst case scenario in which the branch instruction and the instruction specified by the branch target address are both members of the target instruction group. If this assumption is incorrect, then the duplicate copies of the instruction group are simply canceled from the instruction fetch buffer.

Processor Overview

Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each EMS cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by these sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns or, by a block prefetch unit in response to detection of a known sequence of instruction blocks. In response to a request address, L2 cache 16 outputs a cache line of instructions, which are loaded into prefetch buffer (PB) 28 and L1 I-cache 18 via I-cache reload bus 26, possibly after passing through pre-decode logic (not illustrated).

Once the cache line specified by the EA in IFAR 30 resides in L1 cache 18, L1 I-cache 18 outputs the cache line to both branch prediction unit (BPU) 36 and to instruction fetch buffer (IFB) 40. As described further below with respect to FIG. 2, BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table (GCT) 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register (CRR) file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache-20 and L2 cache 16, following effective-to-real translation of the target address.

Branch Prediction Unit

Figure 2:
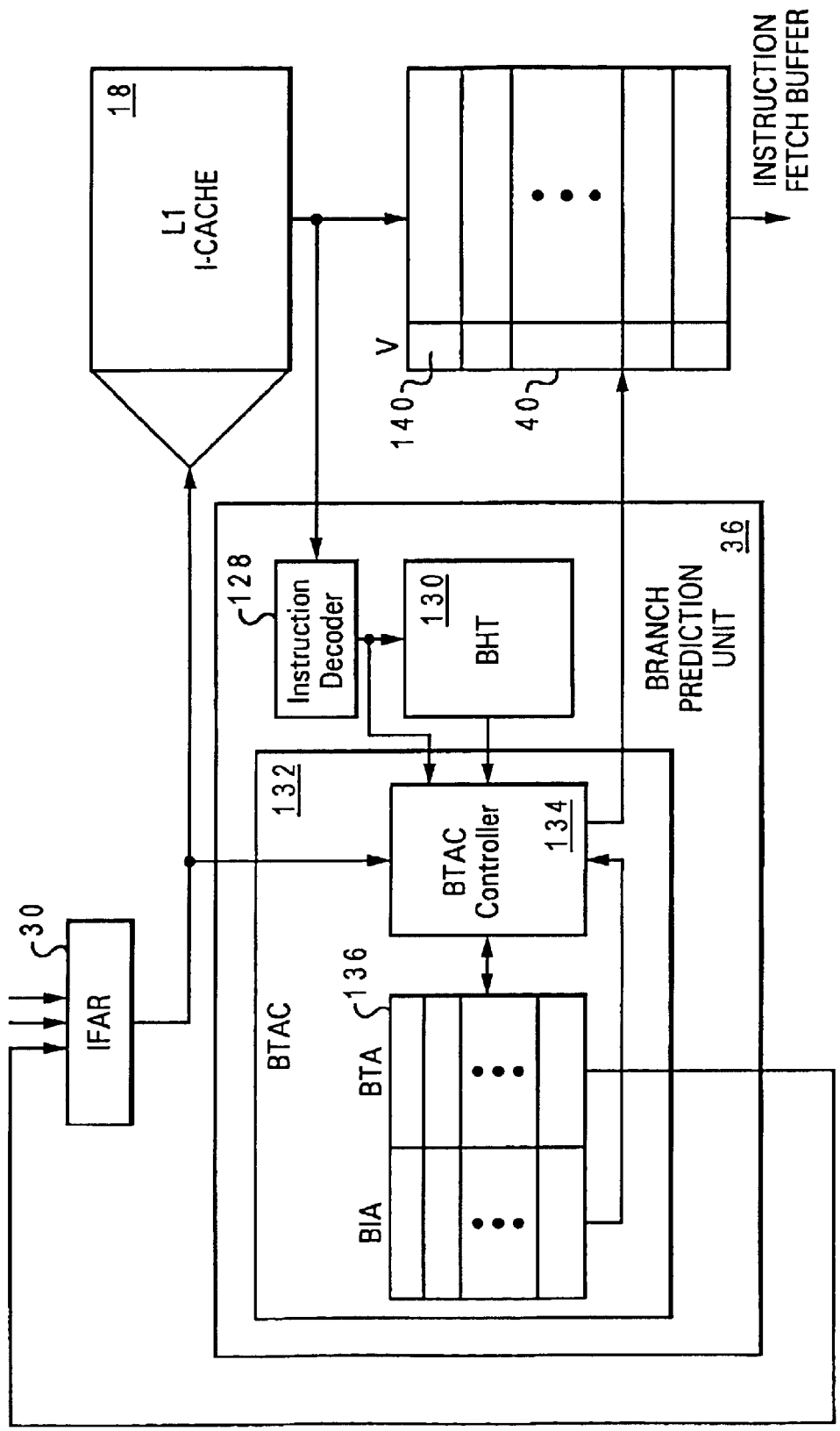
FIG. 2 is a more detailed block diagram of an exemplary embodiment of the branch prediction unit shown in FIG. 1.

Referring now to FIG. 2, there is depicted a more detailed block diagram of an exemplary embodiment of branch prediction unit 36 of FIG. 1 in relation to other components of instruction sequencing logic 13. In the illustrated embodiment, branch prediction unit 36 includes an instruction decoder 128, branch direction prediction circuitry, such as branch history table (BHT) 130, and branch target address prediction circuitry, such as branch target address cache (BTAC) 132. In alternative exemplary embodiments of the present invention, the branch direction prediction circuitry can be implemented with static branch prediction circuitry or two-level dynamic branch prediction circuitry, and the branch target address prediction circuitry can be implemented-with a branch target instruction cache (BTIC).

As shown, BTAC 132 includes a BTAC controller 134 and an address array 136 containing a plurality of entries that each associate a branch instruction address (BIA) with a branch target address (BTA). BTAC controller 134 adds an entry to address array 136 for each branch instruction that BEU 92 resolves as taken, and, when full, replaces older entries with newer entries.

As noted above, BTAC 132 is designed to meet the instruction fetch cycle time of processor 10 even in worst case (i.e., tight loop) scenarios in which the predicted branch target address specifies an instruction in the same cache line as the predicted branch instruction. A tight loop scenario is problematical for prior art BTACs because in such cases the dispatch throughput may exceed the instruction fetch cycle time, leading to a dispatch stall. Thus, in order to avoid a dispatch stall, the time utilized to predict a branch target address based upon the branch instruction in the first instance of the cache line, to supply the branch target address to the instruction cache, and to load the second instance of the cache line into the instruction buffer must be less than the time required to dispatch the instruction(s) in between the branch instruction and the instruction specified by the branch target address.

Figure 3:
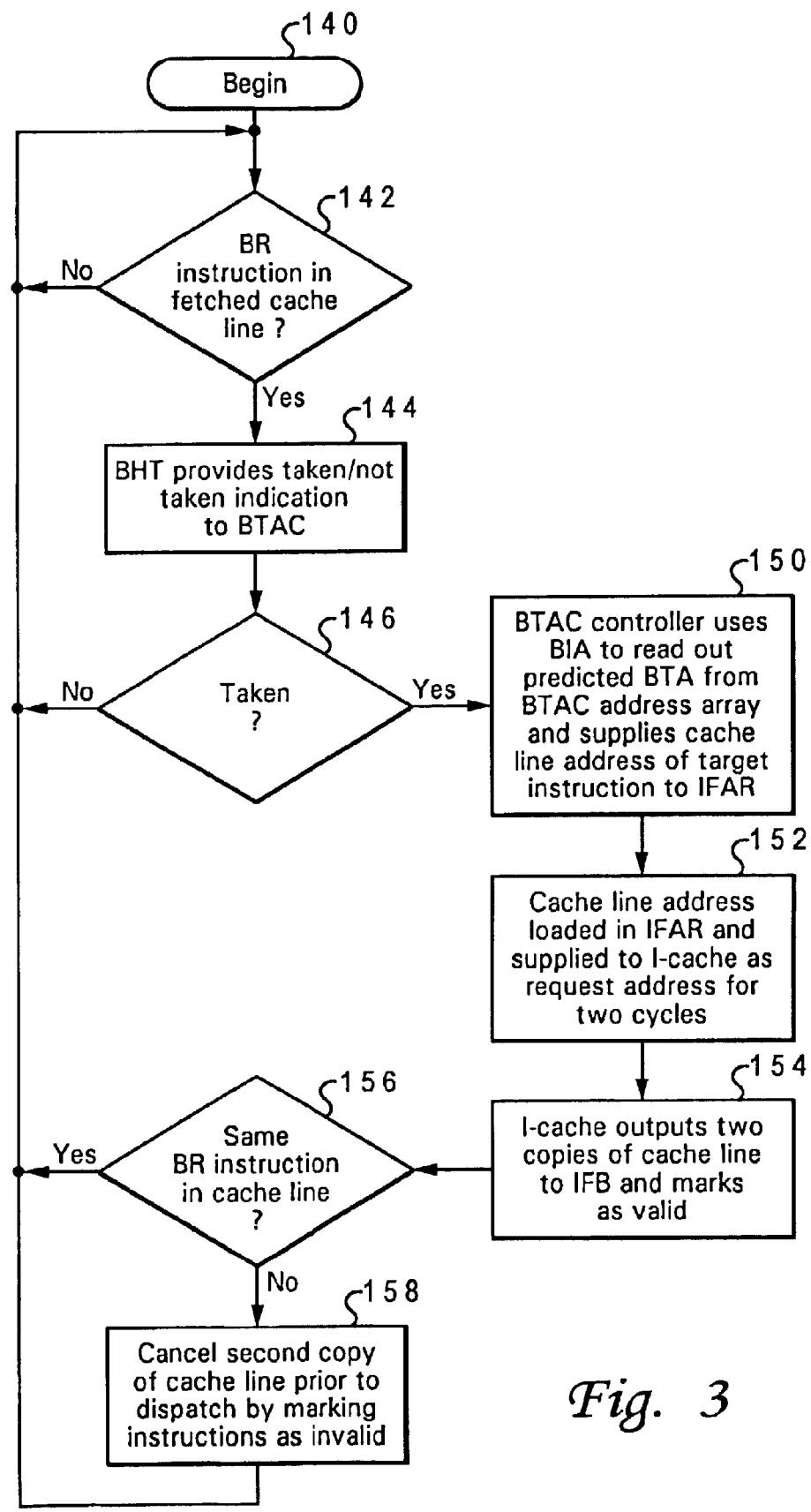
FIG. 3 is a high level logical flowchart of the operation of the branch prediction unit of FIG. 2 in accordance with the present invention.

With reference now to FIG. 3, there is illustrated a high level logical flowchart of the operation of branch prediction unit 36 of FIG. 2, which permits BTAC 132 to meet the instruction fetch cycle time of processor 10 even in cases of tight instruction loops. The process begins at block 140 and thereafter proceeds to block 142, which illustrates instruction decoder 128 scanning the most recently fetched cache line to determine whether or not it contains a branch (BR) instruction. If not, the process iterates at block 142 until instruction decoder 128 detects a branch instruction.

Once instruction decoder 128 detects a branch instruction, instruction decoder 128 passes the branch us instruction's associated branch instruction address (BIA) to BTAC controller 134 and to BHT 130, which outputs a "taken" or "not taken" prediction of the outcome of the branch to BTAC 132, as shown at block 144 of FIG. 3. If the branch is predicted "not taken," branch prediction unit 36 performs no further processing on the branch instruction, and the process passes from block 144 to block 146 and then returns to block 142. If, however, the BHT 130 predicts the branch instruction as "taken," BTAC controller 134 utilizes the BIA supplied by BHT 130 as an index into address array 136 and reads out the branch target address (BTA) associated with the BIA. As illustrated at block 150, BTAC controller 134 then supplies the address of the cache line containing the instruction specified by the BTA to IFAR 30 for two consecutive cycles. For example, in a typical processor implementing a 32-bit addressing scheme and having 8-byte cache lines, the cache line address supplied to IFAR 30 would comprise the high order 29 bits of the BTA concatenated with 3 bits of zeros.

In each of the next two processor cycles, the address selection logic (not illustrated) associated with IFAR 30 loads the cache line address of the instruction specified by the branch target address into IFAR 30 and supplies the cache line address to L1 I-cache 18 as a fetch address, as shown at block 152. Next, as depicted at block 154, L1 I-cache 18 outputs a copy of the cache line identified by the branch target address to instruction fetch buffer (IFB) 40 in each of two consecutive processor cycles. When loaded into IFB 40, the instructions to be executed in each copy of the fetched cache line are marked valid by setting the associated valid bits 140.

BTAC controller 134 then determines at block 156 whether or not the most recently predicted branch instruction is a member of the cache line specified by the branch target address (i.e., whether the branch instruction defines a tight program loop). Those skilled in the art will appreciate that the determination depicted at block 156 can be made in a number of ways. For example, BTAC controller 132 can compare the BIA and BTA to determine whether they fall within the known address range of a cache line of L1 I-cache 18. Alternatively, BTAC controller 134 can compare the BIA, if any, output by instruction decoder 128 with the previous BIA to determine if the two BIAs match. If a tight program loop condition is detected at block 156, then the process depicted in FIG. 3 simply returns to block 142, and the appropriate instructions in both cache lines (which are determined by the BTA) are eventually dispatched and executed, as described above. If, on the other hand, a tight loop condition is not detected at block 156, the second copy of the cache line is canceled from IFB 40 (or at least prior to dispatch) by resetting the appropriate valid bits 140. Thereafter, the process illustrated in FIG. 3 returns to block 142.

As has been described, the present invention provides an improved processor and method of processing branch instructions. According to the present invention, branch target address prediction is improved by fetching multiple copies of a cache line specified by a predicted branch target address under the assumption of a worst case (i.e., tight program loop) condition and, if the assumption is thereafter found to be incorrect, canceling all but one copy of the fetched cache line. In this manner, a branch target cache can meet a processor's instruction fetch cycle time even for tight program loop conditions.

While the invention has been particularly shown and described with reference to a preferred embodiment, it will be understood by those skilled in the art that various changes in form and detail may be made therein without departing from the spirit and scope of the invention.

What is claimed is:

1. A processor, comprising:
at least one execution unit; and
instruction sequencing logic that supplies instructions to said at least one execution unit for execution, said instruction sequencing logic including:
an instruction fetch buffer; and
a branch prediction unit including a branch target cache that, responsive to prediction of a conditional branch instruction as taken, (1) causes multiple copies of a target instruction group to be loaded into said instruction fetch buffer and (2) thereafter causes all but one of said multiple copies to be canceled from said instruction fetch buffer prior to dispatch if said branch instruction does not belong to said target instruction group.

2. The processor of claim 1, wherein said branch target cache comprises a branch target address cache (BTAC).

3. The processor of claim 2, and further comprising an instruction cache coupled to said branch target address cache, wherein said branch target address cache causes said instruction cache to load said multiple copies into said instruction fetch buffer by supplying at least one branch target address.

4. The processor of claim 3, wherein said target instruction group comprises a single cache line of instructions within said instruction cache.

5. The processor of claim 1, wherein said instruction fetch buffer comprises a plurality of entries each having associated therewith a respective one of a plurality of state bits, and wherein said branch target cache causes all but one of said multiple copies of said target instruction group to be canceled by setting at least one state bit among said plurality of state bits.

6. The processor of claim 1, said at least one execution unit comprising a branch execution unit and at least one sequential instruction execution unit.

7. A method of processing instructions in a processor, said method comprising:
in response to prediction of a conditional branch instruction as taken, loading multiple copies of a target instruction group into an instruction fetch buffer; and
thereafter, canceling all but one of said multiple copies from said instruction fetch buffer prior to dispatch if said branch instruction does not belong to said target instruction group.

8. The method of claim 7, and further comprising determining a branch target address of said target instruction group utilizing a branch target address cache (BTAC).

9. The method of claim 8, wherein loading said multiple copies into said instruction fetch buffer comprises loading said multiple copies into said instruction fetch buffer from memory in response to supplying the memory at least the branch target address.

10. The method of claim 7, wherein loading said multiple copies of a target instruction group comprises loading multiple copies of a single cache line of instructions.

11. The method of claim 7, wherein canceling all but one of said multiple copies comprises setting at least one state bit associated with said instruction fetch buffer.

12. The method of claim 7, and further comprising verifying said prediction by executing said branch instruction.

13. A data processing system, comprising:
an interconnect; and at least one processor coupled to the interconnect, said processor including:
  at least one execution unit; and
  instruction sequencing logic that supplies instructions to said at least one execution unit for execution, said instruction sequencing logic including:
  an instruction fetch buffer; and
  a branch prediction unit including a branch target cache that, responsive to prediction of a conditional branch instruction as taken, (1) causes multiple copies of a target instruction group to be loaded into said instruction fetch buffer and (2) thereafter causes all but one of said multiple copies to be canceled from said instruction fetch buffer prior to dispatch if said branch instruction does not belong to said target instruction group.

14. The data processing system of claim 13, wherein said branch target cache comprises a branch target address cache (BTAC).

15. The data processing system of claim 14, and further comprising an instruction cache coupled to said branch target address cache, wherein said branch target address cache causes said instruction cache to load said multiple copies into said instruction fetch buffer by supplying at least one branch target address.

16. The data processing system of claim 15, wherein said target instruction group comprises a single cache line of instructions within said instruction cache.

17. The data processing system of claim 13, wherein said instruction fetch buffer comprises a plurality of entries each having associated therewith a respective one of a plurality of state bits, and wherein said branch target cache causes all but one of said copies of said target instruction group to be canceled by setting at least one state bit among said plurality of state bits.

18. The data processing system of claim 13, said at least one execution unit comprising a branch execution unit and at least one sequential instruction execution unit.

* * * * *

UNITED STATES PATENT AND TRADEMARK OFFICE
CERTIFICATE OF CORRECTION

PATENT NO. : 6,829,702 B1
DATED : December 7, 2004
INVENTOR(S) : Jeremiah et al.

It is certified that error appears in the above-identified patent and that said Letters Patent is hereby corrected as shown below:

Column 8,
Lines 14-18, please replace with the following text after "and":
 -- (2) thereafter, in response to said branch instruction not belonging to said target instruction group, causes all but one of said multiple copies to be canceled from said instruction fetch buffer prior to dispatch. --.
Lines 45-48, please replace with the following text:
 -- thereafter, in response to said branch instruction not belonging to said target instruction group, canceling all but one of said multiple copies from said instruction buffer prior to dispatch. --.

Column 9,
Lines 12-16, please replace with the following text after "and":
 -- (2) thereafter, in response to said branch instruction not belonging to said target instruction group, causes all but one of said multiple copies to be canceled from said instruction fetch buffer prior to dispatch. --.

Signed and Sealed this

Twenty-fifth Day of October, 2005

JON W. DUDAS
*Director of the United States Patent and Trademark Office*